(No Model.)

J. T. LOWE.
DEVICE FOR PRODUCING BLASTS OF AIR FOR VENTILATION, &c.

No. 472,544. Patented Apr. 12, 1892.

Witnesses.
Hancock Neagle
William C. Ryan

Inventor.
John T. Lowe

UNITED STATES PATENT OFFICE.

JOHN T. LOWE, OF SEATTLE, WASHINGTON.

DEVICE FOR PRODUCING BLASTS OF AIR FOR VENTILATION, &c.

SPECIFICATION forming part of Letters Patent No. 472,544, dated April 12, 1892.

Application filed August 31, 1891. Serial No. 404,195. (No model.)

*To all whom it may concern:*

Be it known that I, JOHN T. LOWE, a citizen of the United States, residing at Seattle, in the county of Kings and State of Washington, have invented a new and useful Improvement in Devices for Producing a Blast of Air for Ventilation, Cooling Fires, or any other use where a moderate pressure is required, of which the following is a specification.

My invention relates to improvements in devices for this purpose in which a jet or column of water is discharged downwardly through a pipe or chimney and carries the air along with it.

Figure 1:
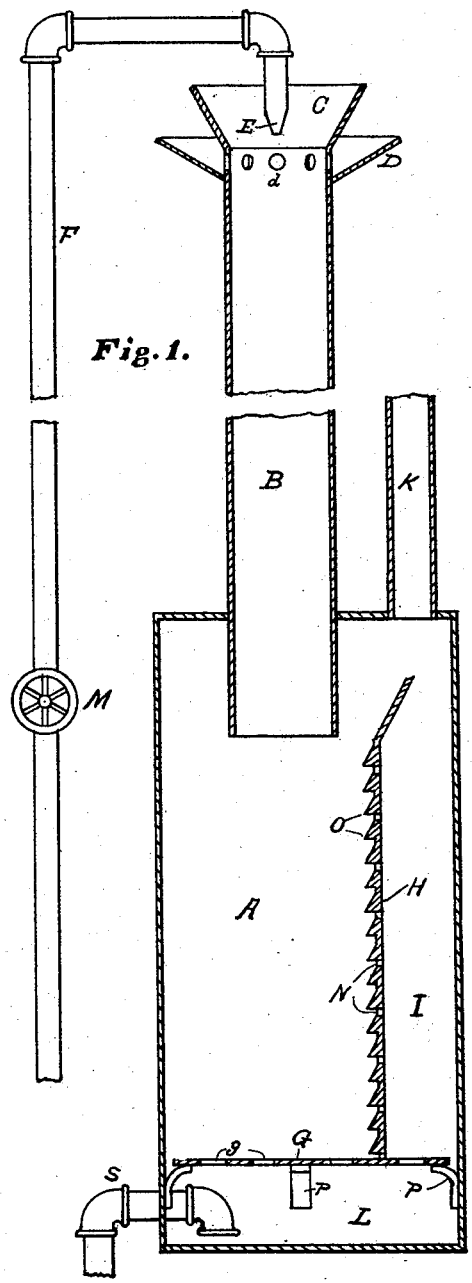
Figure 2:
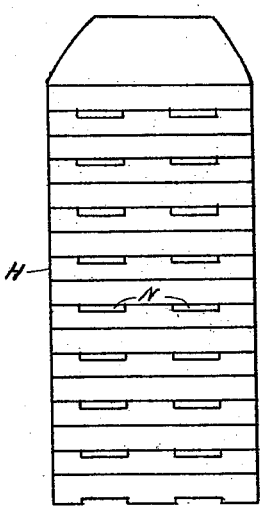

In the drawings, Figure 1 represents the complete device, and Fig. 2 the partition-plate.

A is the chamber of a vessel or tank made of metal, wood, or any convenient material and shape having an opening in its upper end through which projects a pipe B of considerable length. The junction of these two, as of all other pipes entering this chamber, is made air-tight. Near the bottom of the chamber are a number of small brackets P, fastened to the sides. Resting upon these is a false bottom consisting of a perforated plate of a somewhat smaller diameter than that of the chamber. This permits the passage of the water around the plate or through the holes $g$. Resting upon this plate or false bottom is a partition H, which cuts off a portion of the space at one side of the air-chamber. The surface of this partition, which is toward the center of the chamber, is what I call "rippled"—that is, formed into parallel ridges, somewhat like the surface of a wash-board. This plate also has a number of holes or slots N, which allow the air to pass from one side to the other.

K is a pipe entering the top of this chamber and which carries off the air. The pipe B extends upward and ends in a funnel C. In the center of this funnel and pointing downwardly is the orifice E of a water-pipe F, leading from the source of supply. In this pipe is a valve M, by means of which the amount of water can be regulated, and, as a consequence, the pressure of air. When the water is turned on, it issues from the orifice E in a jet and falls down the pipe B. It acts primarily as an injector to create a current of air, and secondarily, by the falling of the water through the pipe, the air is carried along with it. As the water reaches the bottom it passes around the plate G and through the holes in it to the space L. When the water has risen to a sufficient height, it commences to flow out through the siphon S. The air, however, cannot pass through this opening and is carried off through the pipe K. A portion of the air will pass directly out through the pipe K; but part of it will pass through the holes in the partition H. The ridges or ripples O prevent the water from being carried through with it, acting as a scrubber.

Around the pipe B and just below the funnel C is another funnel D. A number of holes $d$ through the pipe permit the entrance of air.

The principle of creating a current of air by the falling of water I know to be old, and I do not broadly claim that; but What I do claim, and desire to secure by Letters Patent, is—

1. The herein-described mechanism, consisting of a chamber A, having a pipe entering its upper end, said pipe extending upward therefrom and terminating in a funnel C, a water-pipe with a contracted orifice or nozzle pointing downwardly over the center of the funnel, an outlet near the bottom of the chamber for the escape of the water and one near the top for the escape of the air, a perforated plate supported just above the water-outlet, and a partition-plate H, having the surface toward the center of the chamber rippled and perforated, substantially as described.

2. The herein-described device, consisting of the chamber A, pipe B, extending upwardly therefrom and ending in the funnel C, a water-pipe F, having a contracted orifice or nozzle pointed downwardly over the center of the funnel, a siphon S near the bottom of the chamber for carrying off the water, brackets or lugs P upon the sides of the chamber, perforated plate G, supported on said brackets, and partition-plate H, having the surface toward the center of the chamber rippled and having the holes N and pipe K at the top of the chamber for carrying off the water, substantially as described.

3. The herein-described mechanism, consisting of the chamber A, pipe B, extending upwardly therefrom and terminating in the funnel C, a water-pipe with a contracted orifice or nozzle extending downwardly over the center of the funnel, valve M on said pipe for regulating the flow, a second funnel D just below funnel C, and holes $d$ from the same into the pipe, a siphon S for carrying off the water, brackets P, perforated plate G, supported thereon just above the siphon, and partition H, having its side toward the center of the chamber rippled and having holes N and pipe K for carrying off the air, substantially as described.

JOHN T. LOWE.

Witnesses:
WILLIAM C. RYAN,
HANCOCK NEAGLE.